United States Patent
Ingram et al.

(10) Patent No.: US 7,856,573 B2
(45) Date of Patent: Dec. 21, 2010

(54) WPAR HALTED ATTACK INTROSPECTION STACK EXECUTION DETECTION

(75) Inventors: Christopher Ray Ingram, Austin, TX (US); Shawn Patrick Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/848,930

(22) Filed: Aug. 31, 2007

(65) Prior Publication Data

US 2009/0063684 A1 Mar. 5, 2009

(51) Int. Cl.
*G06F 11/00* (2006.01)

(52) U.S. Cl. .............. 714/4; 714/43; 714/48; 709/226; 726/3; 726/22

(58) Field of Classification Search ............ 714/2, 714/3, 4, 25, 26, 37, 38, 39, 43, 45, 48; 709/226; 726/3, 14, 22, 23, 24, 34
See application file for complete search history.

(56) References Cited

U.S. PATENT DOCUMENTS

| | | | |
|---|---|---|---|
| 6,442,694 B1 * | 8/2002 | Bergman et al. | 714/57 |
| 6,578,094 B1 | 6/2003 | Moudgill | |
| 6,941,473 B2 | 9/2005 | Etoh et al. | |
| 7,363,656 B2 * | 4/2008 | Weber et al. | 726/23 |
| 2003/0009511 A1 * | 1/2003 | Giotta et al. | 714/4 |
| 2003/0208689 A1 * | 11/2003 | Garza | 713/201 |
| 2004/0199793 A1 * | 10/2004 | Wilken et al. | 713/201 |
| 2004/0221190 A1 * | 11/2004 | Roletto et al. | 714/4 |
| 2005/0240933 A1 * | 10/2005 | Barsness et al. | 718/105 |
| 2006/0106987 A1 | 5/2006 | Barrick et al. | |

* cited by examiner

*Primary Examiner*—Robert Beausoliel
*Assistant Examiner*—Joseph D Manoskey
(74) *Attorney, Agent, or Firm*—Yee & Associates, P.C.; David A. Mims, Jr.

(57) ABSTRACT

Responding to an event at a server that supports workload partitions. An event is detected. The event is an activity that can degrade an ability of the server to function according to an intended purpose. The event is triggered by a communication from a client to the server. Responsive to detecting the event, a connection of the client to the server is temporarily suspended. A first workload partition is created. The connection is re-established between the client and the server. Responsive to re-establishing the connection, all data is routed from the client to the first workload partition. In an illustrative example, the event is allowed to continue on the first workload partition while forensic data is collected on the event.

20 Claims, 4 Drawing Sheets

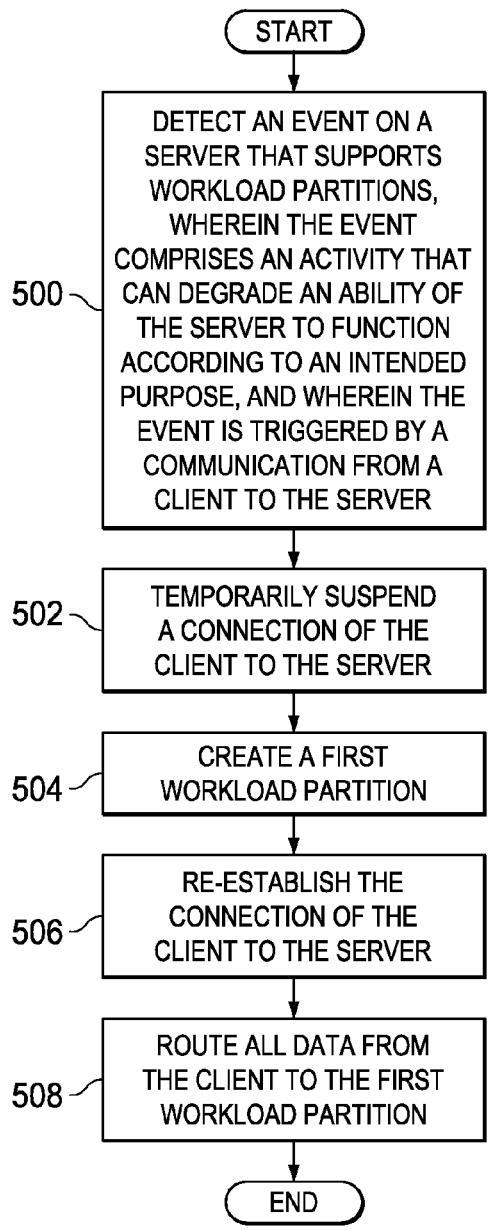
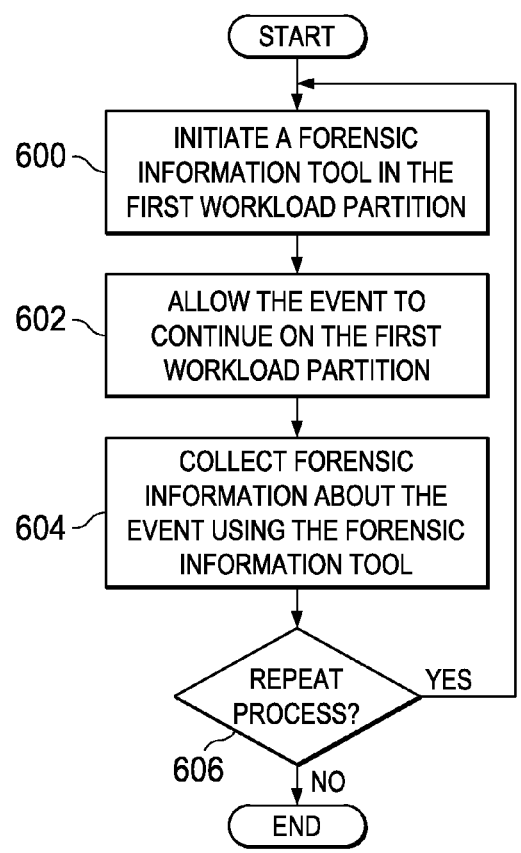

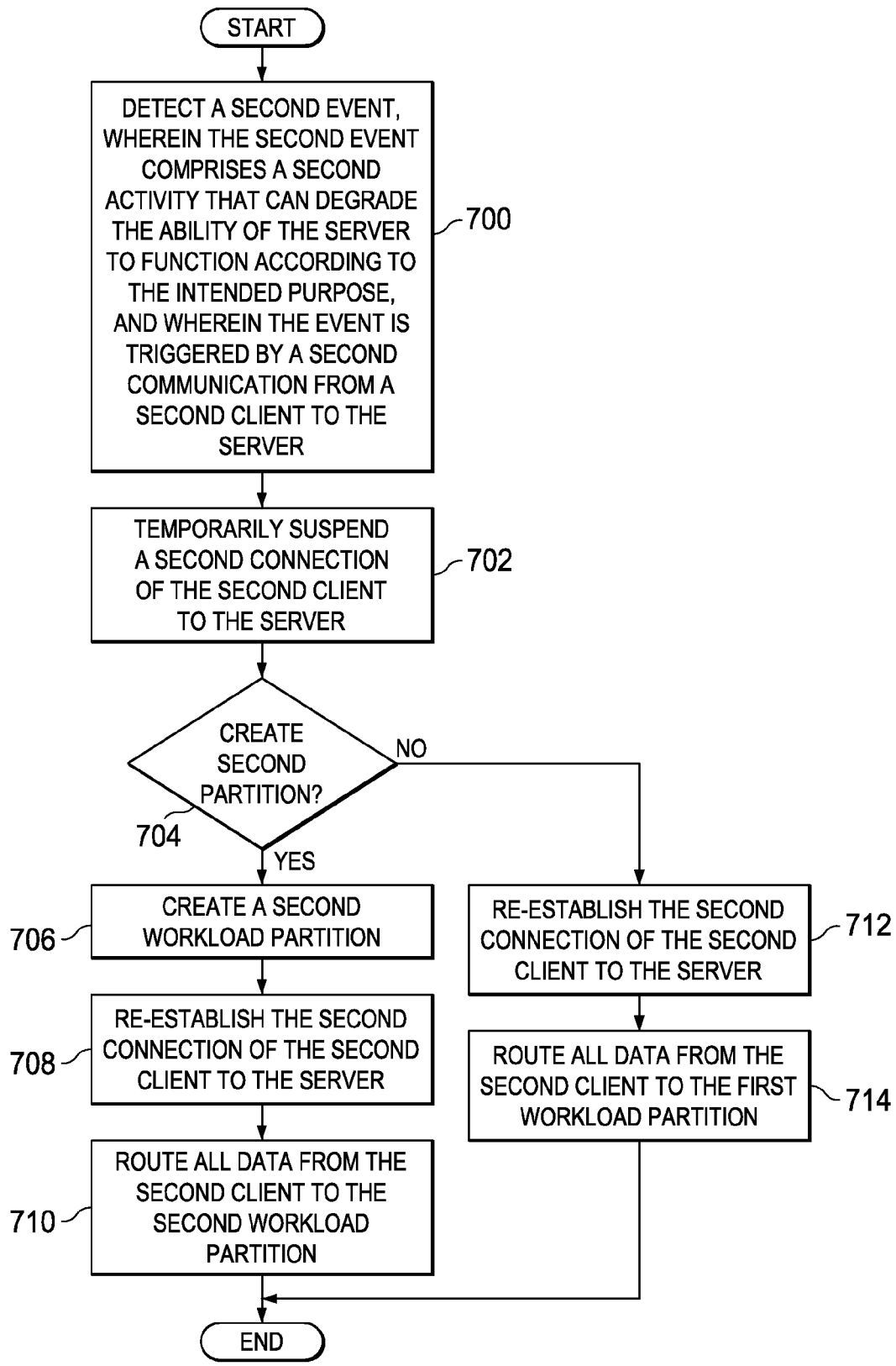

WPAR HALTED ATTACK INTROSPECTION STACK EXECUTION DETECTION

BACKGROUND OF THE INVENTION

1. Field of the Invention

The present invention relates generally to an improved data processing system and in particular to responding to events on a server. Still more particularly, the present invention relates to responding to attacks or errors on a server that degrade an ability of the server to perform an intended purpose.

2. Description of the Related Art

A continuing problem in modern computing systems is attacks by remote clients on servers. Attacks can come in many forms, but are generally categorized as either denial of service (DOS) attacks or takeover attacks. Denial of service attacks seek to disable a service, such as a banking Internet service system. Usually, denial of service attacks seek to overwhelm one or more servers or software programs by flooding the servers or software programs with bogus data packets. Takeover attacks are more rare, but are more insidious as they seek to actually take over the server or software programs.

In addition to attacks, servers or software programs handling network traffic can have relatively normal operating problems. For example, execution of an uncommon code path, a programming error, and an exception during execution of a program operating on one of the servers or clients can also cause a suspension of service.

However, whether the event is malicious or benign, the effect can be the same: denial of service. In the case of large business enterprises, the cost of a service being down can be in the millions of dollars even if the service is down for only a few hours.

SUMMARY OF THE INVENTION

The aspects of the present invention provide for a computer implemented method, apparatus, and computer usable program code for responding to an event at a server that supports workload partitions. An event is detected. The event is an activity that can degrade an ability of the server to function according to an intended purpose. The event is triggered by a communication from a client to the server. Responsive to detecting the event, a connection of the client to the server is temporarily suspended. A first workload partition is created. The connection is re-established between the client and the server. Responsive to re-establishing the connection, all data is routed from the client to the first workload partition. In an illustrative example, the event is allowed to continue on the first workload partition while forensic data is collected on the event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a method, implemented on a server, for responding to an event at the server, in accordance with an illustrative embodiment;

FIG. 6 is a flowchart of a method, implemented on a server, for responding to an event at the server, in accordance with an illustrative embodiment; and FIG. 7 is a flowchart of a method, implemented on a server, for responding to an event at the server, in accordance with an illustrative embodiment.

DETAILED DESCRIPTION OF THE PREFERRED EMBODIMENT

Figure 1:
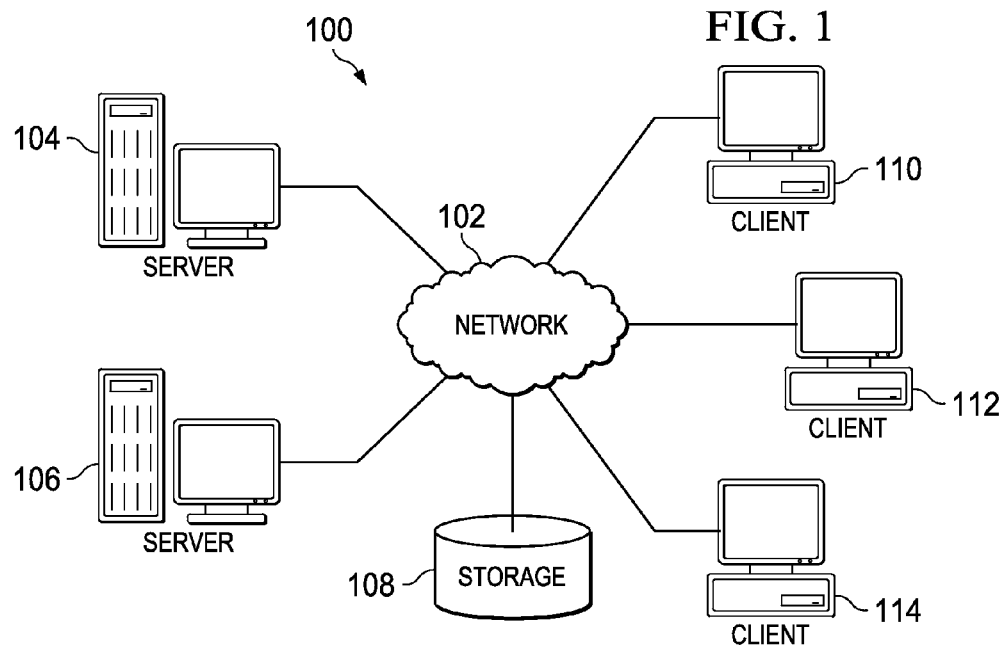
FIG. 1 is a pictorial representation of a network of data processing systems, in which illustrative embodiments may be implemented.
Figure 2:
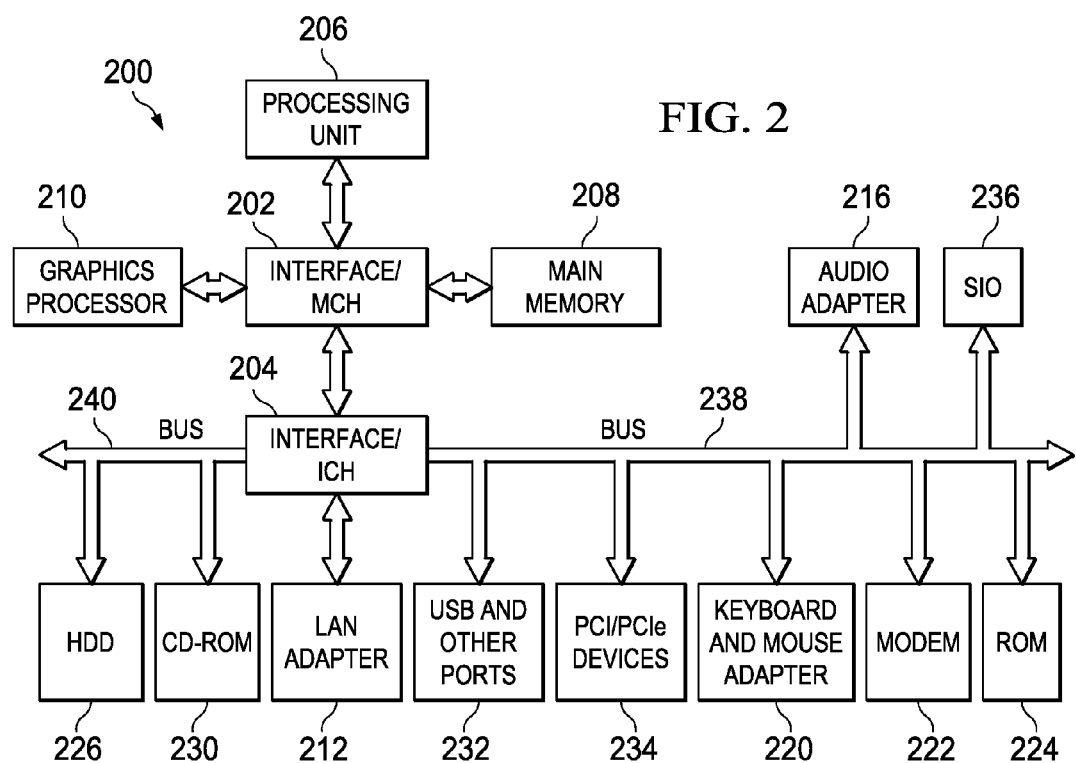
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system, such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache, such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for responding to an event at a server that supports workload partitions. An event is detected. The event is an activity that can degrade an ability of the server to function according to an intended purpose. The event is triggered by a communication from a client to the server. Responsive to detecting the event, a connection of the client to the server is temporarily suspended. A first workload partition is created. The connection is re-established between the client and the server. Responsive to re-establishing the connection, all data is routed from the client to the first workload partition.

Thus, the aspects of the present invention allow an attack or error to be quarantined on a separate workload partition. If the event is an attack, such as a denial of service attack or a takeover attack, then the attack is allowed to continue, while forensic data is accumulated about the attack. In this way, the attack can be more permanently defeated. Additionally, identification of the attacker is more likely because the attacker believes that the attack has succeeded, when in actuality the attack has been quarantined and is being monitored.

Figure 3:
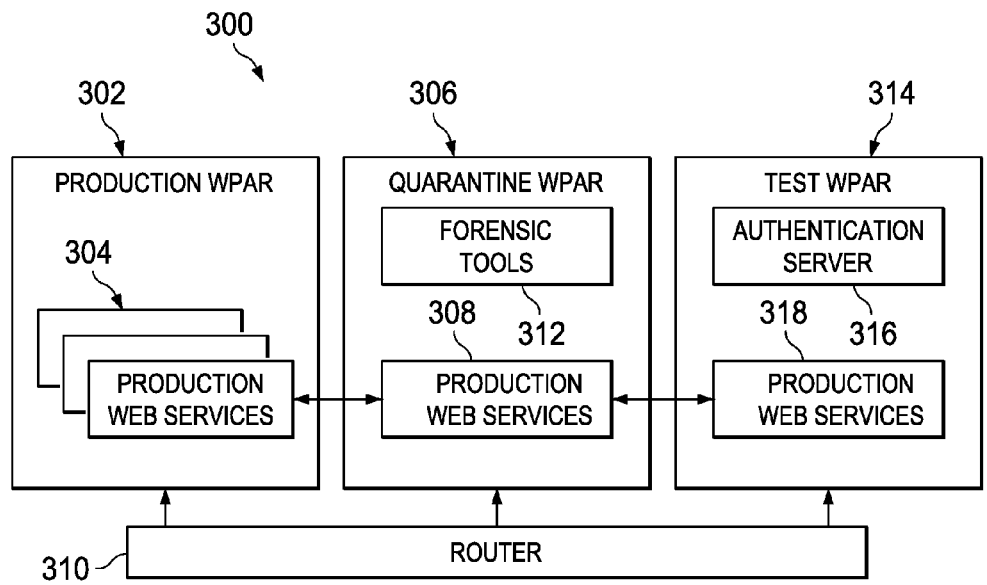
FIG. 3 is a block diagram of a router communicating with three workload partitions, in accordance with an illustrative embodiment.

FIG. 3 is a block diagram of a router communicating with three workload partitions, in accordance with an illustrative embodiment. The workload partitions shown in FIG. 3 can be implemented in a data processing system, such as data processing system 200 of FIG. 2, or servers 104 and 106 of FIG. 1.

System 300 includes a number of workload partitions, which can be referred-to as "WPARs." Each workload partition is a logical division of one or more servers. Each workload partition can operate one or more software programs operating on one or more operating systems. Production workload partition 302 supports production web services 304, which represent the software used to conduct a business enterprise. Production web services 304 represent the normal operations of a business enterprise. In other illustrative embodiments, one or more additional production workload partitions are running simultaneously.

In an illustrative example, production workload partition 302 operates AIX. AIX is an open, UNIX-based operating system.

AIX includes a feature known as stack execution detection (SED), particularly with respect to POWER5® processors. Stack execution detection can detect a user attempting to leverage a common hacking technique known as stack buffer overflow. Stack execution detection can also prevent this hacking technique.

Stack execution detection operates by detecting whether a program is attempting to execute in the stack address page of the server. In response, stack execution detection sends a "SIGBUS" signal to the process, which causes the program or service to core dump. A core dump results in the service being disabled until re-installed. For example, if a server is running Websphere network service and a user attempted a stack buffer overflow attack, stack execution detection would core dump Websphere. Although this response is drastic, many users consider a core dump to be preferable to takeover of the service.

However, this approach has the problem of effectively changing the takeover attack into a denial of service attack. This approach has the additional problem that only about 10% of attacks are takeover attacks, with the remainder of attacks being denial of service attacks.

FIG. 3 shows a solution to this problem. If stack execution detection detects an attack, or if some other attack or problem is detected with respect to production workload partition 302, then an administer, or the operating system itself, can cause AIX to generate quarantine workload partition 306. Copy 308 of environment of production web services 304 is then established on quarantine workload partition 306.

In an illustrative embodiment, the operating system is AIX. In AIX, copy 308 can be created by replicating production workload partition 302 using a "mksysb" command. A process for automated cloning of workload partitions can be created easily. Additionally, AIX workload partitions can have backup and restore features which can be used to duplicate all data, applications, and install bases from one workload partition to another workload partition.

The operating system, which can be AIX, then suspends the connection of the client responsible for the attack or for the problem. Nearly immediately thereafter, connection is re-established between the client and the server. However, router 310 is commanded to send all data from the offending client to quarantine workload partition 306.

Copy of production web services 308 then continues operation. If the event is an attack, then the attacker is led to believe that the attack is successful. In actuality, the attack is confined to quarantine workload partition 306. Normal operation of production workload partition 302 continues relatively uninterrupted.

In the meantime, forensic tools 312 are established in quarantine workload partition 306. Forensic tools 312 can be used to fix service code, detect and block the incoming network packets, scan for viruses, scan for malware, and/or to identify an attacker. Thus, forensic tools 312 can be considered an extended detection and debugging tool. If the event is a benign event, such as an unusual code path, then the forensic tools 312 can be used to identify the source of the problem and possibly used to correct the problem. Examples of forensic tools include iLook™, Chicago Neohapsis Real-World Labs®, AccessData™, and dtSearch™, Guidance Software™.

In an illustrative embodiment, test workload partition 314 can also be established to perform additional testing services on quarantine workload partition 306. For example, authentication server 316 can provide a secure and auditable path to quarantine workload partition 306. Thus, authentication server 316 provides one example of how to allow forensics data to be collected and a chain of custody to be maintained. In another illustrative example, additional production web service 318 can be used to baseline what is being collected from the version of the "Production Web Services" on quarantine workload partition 306. Thus, additional production web service 318 can operate as a plug-in for whatever forensic tools may be running on or through the test workload partition 314. Test workload partition 314 can include additional forensic tools and other software to aid in the analysis of an attack, problem, or event that resulted in data being routed to quarantine workload partition 306.

Thus, the aspects of the present invention provide for a computer implemented method, apparatus, and computer usable program code for responding to an event at a server that supports workload partitions. The event is an activity that can degrade an ability of the server to function according to an intended purpose. Examples of activities include an attack by a malicious user, execution of an uncommon code path, a programming error, and an exception during execution of a program operating on one of the server and the client, a local process, a local thread, or some other event that causes a problem with respect to server or software performance.

The term "degrade" means that service is interrupted or that service is reduced or slowed as a result of the event. The term "intended purpose" refers to the purpose, effect, output, or process of the affected service, software, or hardware. Thus, the intended purpose can be at least one of: to operate above a predetermined efficiency, to continue operation, and to avoid loss of control to the client. Non-limiting examples of "intended purposes" also include processing incoming data to respond to client requests, receiving incoming data, transmitting response data, and any other purpose which a system is to perform.

In an illustrative example, the event is triggered by a communication from a client to the server. However, the event could result from some internal workings of production web services 304 or workload partition 302. The event can be at least one of a denial of service attack, a takeover attack, execution of an uncommon code path, a programming error, and an exception during execution of a program operating on one of the server and the client.

Responsive to detecting the event, a connection of the client to the server is temporarily suspended. A first workload partition is created. The first workload partition can be, in an illustrative example, quarantine workload partition 306. The connection is re-established between the client and the server. Responsive to re-establishing the connection, all data is routed from the client to the first workload partition via router 310. In an illustrative example, router 310 is a front end spray router. Overall, this process can be referred to "workload partition (WPAR) halted attack introspection stack execution detection." This process can also be referred to as "WHAT_I_SED."

In an illustrative example, the event is allowed to continue on the first workload partition while forensic data is collected on the event. Thus, an attacker can be tricked into believing that an attack is successful, thereby providing more time to conduct a forensic analysis of the attack.

In an illustrative example, a forensic information tool is initiated in the first workload partition. As described above, the event is allowed to continue on the first workload partition. Forensic information is then collected about the event using the forensic information tool.

In an illustrative example, the forensic information is data regarding at least one of network data, at least one incoming packet from the client, at least one router through which the event is routed, and virus information. Forensic information can also be any information of interest in analyzing a source of the event, a means for inhibiting or stopping the event, or any other information of interest related to the event.

In another illustrative example, a second event is detected. The second event is a second activity that can degrade the ability of the server to function according to the intended purpose. Again, the event can be triggered by a second communication from a second client to the server. Responsive to detecting the second event, a second connection of the second client to the server is temporarily suspended. A second workload partition is then created. The second connection of the second client to the server is re-established. Responsive to re-establishing the second connection, all data is routed from the second client to the second workload partition. The router can be a front end spray router.

In another illustrative example, a second event is detected. As with the above example, the second event is a second activity that can degrade the ability of the server to function according to the intended purpose, and the event can be triggered by a second communication from a second client to the server. Also similar to the above example, responsive to detecting the second event, a second connection of the second client to the server is temporarily suspended and subsequently re-established. However, responsive to re-establishing the second connection, all data is routed from the second client to the first workload partition.

For any of the above methods, additional illustrative embodiments can be implemented. For example, detecting can be performed using stack execution detection, especially with respect to an AIX environment. The term "triggering" can refer to the actual cause of an event, or can refer to some activity that results in a cause of the event.

Figure 4:
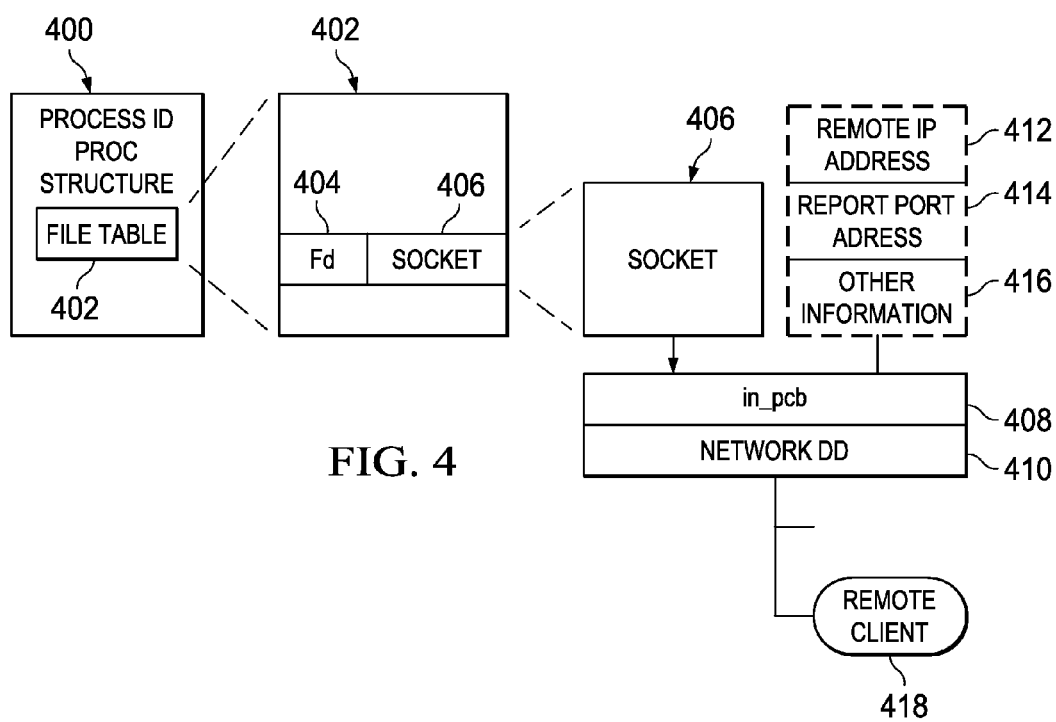
FIG. 4 is a block diagram of systems that can be used to identify a particular client, in accordance with an illustrative embodiment.

FIG. 4 is a block diagram of systems that can be used to identify a particular client, in accordance with an illustrative embodiment. The block diagram shown in FIG. 4 can be implemented on a data processing system, such as data processing system 200 of FIG. 2, or servers 104 and 106 of FIG. 1. The block diagram shown in FIG. 4 can be implemented with respect to quarantine workload partition 306 of FIG. 3 in order to allow forensic tools 312 of FIG. 3 to identify which client is responsible for an attack.

Process identification (ID) process structure 400 includes file table 402. Process identification process structure 400 is a data structure available in software or an operating system, such as, but not limited to, AIX. File table 402 includes file descriptor (fd) 404, which is associated with socket 406. Socket 406 can be used to refer to an internet protocol control block (in_pcb) 408 associated with network device driver 410. Internet protocol control block 408 stores information regarding connection information for a session connection. This information includes remote Internet protocol (IP) address 412, remote port address 414, and other information 416. Other information 416 includes, but is not necessarily limited to, associated local and remote address data, including options that can be used during the session for a particular Internet protocol connection.

In an illustrative example related to AIX operating systems, an exception handler code in AIX can be chanted to find the remote Internet protocol address which caused a buffer overflow. FIG. 4 shows the data chain used to perform this function.

In the case of AIX, the stack execution detection exception handler has access to process identification process structure 400. This access can be used to reference file table 402, and hence socket 406. A pointer in socket 406 can be used to reference the Internet protocol control block, and specifically to reference an "IF_INET" value that specifies a connection type. As a whole, the Internet protocol control block thus contains enough information to identify remote client 418. Note that this solution works at the Internet protocol level, and thus covers many types of connections, such as, but not limited to, transmission control protocol (TCP) and user datagram protocol (UDP).

In most cases, remote IP address 412 is sufficient information to construct a routing rule. This information can be sent to a router, such as router 310 in FIG. 3, in order to route traffic from remote client 418 to the quarantine workload partition, such as quarantine workload partition 306 in FIG. 3. Note that the local operating system can also construct its own routing entry table to also route traffic from remote client 418 to quarantine workload partition 306.

FIG. 5 is a flowchart of a method, implemented on a server, for responding to an event at the server, in accordance with an illustrative embodiment. The method shown in FIG. 5 can be implemented on a data processing system, such as data processing system 200 of FIG. 2, or servers 104 and 106 of FIG. 1. The method shown in FIG. 5 can be implemented in a workload partition environment, such as the workload partition environment described with respect to FIG. 3.

The process begins as the server detects an event on the server, wherein the event comprises an activity that can degrade an ability of the server to function according to an intended purpose, and wherein the event is triggered by a communication from a client to the server (step 500). The server then temporarily suspends a connection of the client to the server (step 502).

Relatively quickly, within a matter of seconds at most, the server creates a first workload partition (step 504). The first workload partition can be referred to as a quarantine workload partition.

The server then re-establishes the connection of the client to the server (step 506). However, the server routes all data from the client to the first workload partition (step 508). In this manner, the server effectively quarantines the attack to an isolated, controllable workload partition. The process terminates thereafter.

FIG. 6 is a flowchart of a method, implemented on a server, for responding to an event at the server, in accordance with an illustrative embodiment. The method shown in FIG. 6 can be implemented on a data processing system, such as data processing system 200 of FIG. 2, or servers 104 and 106 of FIG. 1. The method shown in FIG. 6 can be implemented in a workload partition environment, such as the workload partition environment described with respect to FIG. 3. The method shown in FIG. 6 can be performed after or as part of the process shown in FIG. 5.

The process begins as the server initiates a forensic information tool in the first workload partition (step 600). More than one forensic tool can be initiated. Examples of forensic tools include iLook™, Chicago Neohapsis Real-World Labs®, AccessData™, and dtSearch™, Guidance Software™.

The server then allows the event to continue on the first workload partition (step 602). If the event is an attack, then the attacker is fooled into believing that the attack is successful. However, in reality, the attack is only occurring within the controlled environment of the quarantine workload partition. Whether or not the event is an attack or some non-malicious, harmful problem, the server collects forensic information about the event using the forensic information tool (step 604).

The server then determines whether to repeat the process (step 606). If the process is to be repeated, then the process returns to step 600 and repeats. Otherwise, the process terminates.

FIG. 7 is a flowchart of a method, implemented on a server, for responding to an event at the server, in accordance with an illustrative embodiment. The method shown in FIG. 7 can be implemented on a data processing system, such as data processing system 200 of FIG. 2, or servers 104 and 106 of FIG. 1. The method shown in FIG. 7 can be implemented in a workload partition environment, such as the workload partition environment described with respect to FIG. 3. The method shown in FIG. 7 can be performed after or as part of the process shown in FIG. 5 and/or FIG. 6.

The process begins as the server detects a second event, wherein the second event comprises a second activity that can degrade the ability of the server to function according to the intended purpose, and wherein the event is triggered by a second communication from a second client to the server (step 700). In response, the server temporarily suspends a second connection of the second client to the server (step 702).

The server then determines whether to create a second partition (step 704). If a second partition is to be created, then the server creates a second workload partition (step 706). The second workload partition can be referred to as a second quarantine workload partition.

The server then re-establishes the second connection of the second client to the server (step 708). However, the server routes all data from the second client to the second workload partition (step 710). The process terminates thereafter.

Returning to step 704, if a second partition is not to be created, then the server still re-establishes the second connection of the second client to the server (step 712). The server then routes all data from the second client to the first workload partition (step 714). The process terminates thereafter.

Thus, the server has the option of sending additional attacks to the same quarantine workload partition to which the first set of attacks are routed, or to a different quarantine workload partition. In this manner different attacks can be monitored or contained according to a method selected by an operator, or according to a method selected by software responsible for executing the illustrative methods.

Thus, the aspects of the present invention allow an attack or error to be quarantined on a separate workload partition. If the event is an attack, such as a denial of service attack or a takeover attack, then the attack is allowed to continue, while forensic data is accumulated about the attack. In this way, the attack can be more permanently defeated. Additionally, identification of the attacker is more likely because the attacker believes that the attack has succeeded, when in actuality the attack has been quarantined and is being monitored.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, implemented on a server that supports workload partitions, for responding to an event at the server, the method comprising:

detecting the event, wherein the event comprises an activity that can degrade an ability of the server to function according to an intended purpose, and wherein the event is triggered by a communication from a client to the server;

responsive to detecting the event, temporarily suspending a connection of the client to the server;

further responsive to detecting the event, creating a first workload partition;

re-establishing the connection of the client to the server; and responsive to re-establishing the connection, routing all data from the client to the first workload partition.

2. The method of claim 1 further comprising:

initiating a forensic information tool in the first workload partition;

allowing the event to continue on the first workload partition; and collecting forensic information about the event using the forensic information tool.

3. The method of claim 2 wherein the forensic information comprises data regarding at least one of network data, at least one incoming packet from the client, at least one router through which the event is routed, and virus information.

4. The method of claim 1, wherein the first workload partition is a logical partition of the server that supports workload partitions, wherein the first workload partition operates one or more software programs operating on one or more operating systems of the server that supports workload partitions, wherein the event comprises at least one of a denial of service attack and a takeover attack.

5. The method of claim 1 wherein the event is at least one of execution of an uncommon code path, a programming error, and an exception during execution of a program operating on one of the server and the client.

6. The method of claim 1 further comprising:
detecting a second event, wherein the second event comprises a second activity that can degrade the ability of the server to function according to the intended purpose, and wherein the event is triggered by a second communication from a second client to the server;
responsive to detecting the second event, temporarily suspending a second connection of the second client to the server;
creating a second workload partition;
re-establishing the second connection of the second client to the server; and
responsive to re-establishing the second connection, routing all data from the second client to the second workload partition.

7. The method of claim 1 further comprising:
detecting a second event, wherein the second event comprises a second activity that can degrade the ability of the server to function according to the intended purpose, and wherein the event is triggered by a second communication from a second client to the server;
responsive to detecting the second event, temporarily suspending a second connection of the second client to the server;
re-establishing the second connection of the second client to the server; and
responsive to re-establishing the second connection, routing all data from the second client to the first workload partition.

8. The method of claim 1 wherein detecting is performed using stack execution detection.

9. The method of claim 1 wherein triggering comprises causing.

10. The method of claim 1 wherein routing is performed using a front end spray router.

11. The method of claim 1 wherein the intended purpose comprises at least one of:
to operate above a predetermined efficiency, to continue operation, and to avoid loss of control to the client.

12. A computer readable storage medium having computer usable program code stored thereon for implementation on a server that supports workload partitions, wherein the computer usable program code is for responding to an event at the server, the computer program product including:
computer usable program code for detecting the event, wherein the event comprises an activity that can degrade an ability of the server to function according to an intended purpose, and wherein the event is triggered by a communication from a client to the server;
computer usable program code for, responsive to detecting the event, temporarily suspending a connection of the client to the server;
computer usable program code for creating a first workload partition;
computer usable program code for re-establishing the connection of the client to the server; and
computer usable program code for, responsive to re-establishing the connection, routing all data from the client to the first workload partition.

13. The computer readable medium of claim 12 further comprising:
computer usable program code for initiating a forensic information tool in the first workload partition;
computer usable program code for allowing the event to continue on the first workload partition; and
computer usable program code for collecting forensic information about the event using the forensic information tool.

14. The computer readable medium of claim 13 wherein the forensic information comprises data regarding at least one of network data, at least one incoming packet from the client, at least one router through which the event is routed, and virus information.

15. The computer readable medium of claim 12 further comprising:
computer usable program code for detecting a second event, wherein the second event comprises a second activity that can degrade the ability of the server to function according to the intended purpose, and wherein the event is triggered by a second communication from a second client to the server;
computer usable program code for, responsive to detecting the second event, temporarily suspending a second connection of the second client to the server;
computer usable program code for creating a second workload partition;
computer usable program code for re-establishing the second connection of the second client to the server; and
computer usable program code for ,responsive to re-establishing the second connection, routing all data from the second client to the second workload partition.

16. The computer readable medium of claim 12 further comprising:
computer usable program code for detecting a second event, wherein the second event comprises a second activity that can degrade the ability of the server to function according to the intended purpose, and wherein the event is triggered by a second communication from a second client to the server;
computer usable program code for, responsive to detecting the second event, temporarily suspending a second connection of the second client to the server;
computer usable program code for re-establishing the second connection of the second client to the server; and
computer usable program code for, responsive to re-establishing the second connection, routing all data from the second client to the first workload partition.

17. A data processing system comprising:
a bus;
at least one processor coupled to the bus;
a computer usable medium coupled to the bus, wherein the computer usable medium contains a set of instructions implemented on a server that supports workload partitions, wherein the set of instructions is for responding to an event at the server, wherein the at least one processor is adapted to carry out the set of instructions to:
detect the event, wherein the event comprises an activity that can degrade an ability of the server to function according to an intended purpose, and wherein the event is triggered by a communication from a client to the server;
responsive to detecting the event, temporarily suspend a connection of the client to the server;
create a first workload partition;
re-establish the connection of the client to the server; and
responsive to re-establishing the connection, route all data from the client to the first workload partition.

18. The data processing system of claim 17 wherein the at least one processor is further adapted to carry out the set of instructions to:

initiate a forensic information tool in the first workload partition;

allow the event to continue on the first workload partition; and collect forensic information about the event using the forensic information tool.

19. The data processing system of claim 18 wherein the forensic information comprises data regarding at least one of network data, at least one incoming packet from the client, at least one router through which the event is routed, and virus information.

20. The data processing system of claim 17 wherein the at least one processor is further adapted to carry out the set of instructions to:

detect a second event, wherein the second event comprises a second activity that can degrade the ability of the server to function according to the intended purpose, and wherein the event is triggered by a second communication from a second client to the server;

responsive to detecting the second event, temporarily suspend a second connection of the second client to the server;

create a second workload partition;

re-establish the second connection of the second client to the server; and responsive to re-establishing the second connection, route all data from the second client to the second workload partition.

\* \* \* \* \*